(12) United States Patent
Maaniitty et al.

(10) Patent No.: US 8,683,341 B2
(45) Date of Patent: *Mar. 25, 2014

(54) MULTIMEDIA PRESENTATION EDITOR FOR A SMALL-DISPLAY COMMUNICATION TERMINAL OR COMPUTING DEVICE

(75) Inventors: Jussi Maaniitty, Tampere (FI); Pauli Askainen, Lempaala (FI); Krzysztof Wasilewski, Tampere (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 6 days.

This patent is subject to a terminal disclaimer.

(21) Appl. No.: 13/274,620

(22) Filed: Oct. 17, 2011

(65) Prior Publication Data

US 2012/0089916 A1   Apr. 12, 2012

Related U.S. Application Data

(63) Continuation of application No. 10/694,715, filed on Oct. 27, 2003, now Pat. No. 8,065,616.

(51) Int. Cl.
*G06F 3/00* (2006.01)

(52) U.S. Cl.
USPC .......................................................... 715/732

(58) Field of Classification Search
USPC .......................................................... 715/732
See application file for complete search history.

(56) References Cited

U.S. PATENT DOCUMENTS

| | | | |
|---|---|---|---|
| 5,440,678 A | 8/1995 | Eisen et al. | |
| 5,917,483 A * | 6/1999 | Duncan et al. | 715/802 |
| 6,166,736 A * | 12/2000 | Hugh | 715/798 |
| 6,345,279 B1 | 2/2002 | Li et al. | |
| 6,738,075 B1 | 5/2004 | Torres et al. | |
| 6,781,610 B2 * | 8/2004 | Os et al. | 715/764 |
| 7,149,755 B2 | 12/2006 | Obrador | |
| 7,278,113 B1 * | 10/2007 | Racine et al. | 715/780 |
| 7,330,875 B1 | 2/2008 | Parasnis et al. | |
| 7,337,403 B2 | 2/2008 | Pavley et al. | |
| 2002/0059342 A1 | 5/2002 | Gupta et al. | |
| 2002/0161797 A1 * | 10/2002 | Gallo et al. | 707/500.1 |
| 2003/0164859 A1 * | 9/2003 | Evans | 345/792 |
| 2003/0174160 A1 | 9/2003 | Deutscher et al. | |

(Continued)

OTHER PUBLICATIONS

Jun. 16, 2011, Supplementary European Search Report under Article 153(7) EPC for EPA 04769660.411527 / 1682962 PCT/IB2004003399 of Applicant Nokia Corporation, 3 pages total.

(Continued)

*Primary Examiner* — Ryan Pitaro (57) ABSTRACT

A method by which a multimedia presentation editor for use on a (typically handheld) communication or computing terminal (10) interfaces with a user so as to allow the user to create or edit a presentation (20), including: a step (51) in which objects to be displayed successively when a slide (21) is displayed in play mode, are instead assembled by the editor one under another in a column (25*a*), and objects (22) to be displayed continuously are also assembled in a (one-object-long) column (25*b*); and a step (52) in which the editor displays each column (25*a-b*) side-by-side, corresponding to the side-by-side arrangement of respective objects in the different columns (25*a-b*) when the slide (21) is displayed in play mode, thus allowing some parts of the slide (21) to be fixed, and some parts (23*a-c*) to change—the parts having columns with more than one object. Corresponding equipment is also provided.

15 Claims, 4 Drawing Sheets

(56) References Cited

U.S. PATENT DOCUMENTS

| | | | |
|---|---|---|---|
| 2003/0188255 A1* | 10/2003 | Shimizu et al. | 715/501.1 |
| 2003/0222899 A1* | 12/2003 | Alvesalo | 345/716 |
| 2004/0119745 A1* | 6/2004 | Bartek et al. | 345/763 |
| 2004/0130566 A1 | 7/2004 | Banerjee et al. | |
| 2004/0205477 A1* | 10/2004 | Lin | 715/500.1 |
| 2005/0044499 A1* | 2/2005 | Allen et al. | 715/704 |
| 2005/0091610 A1 | 4/2005 | Frei et al. | |
| 2005/0283741 A1* | 12/2005 | Balabanovic et al. | 715/838 |
| 2006/0168619 A1 | 7/2006 | Reams | |
| 2006/0288113 A1* | 12/2006 | Saunders et al. | 709/231 |
| 2009/0276535 A1* | 11/2009 | Saunders et al. | 709/229 |

OTHER PUBLICATIONS

Mar. 21, 2012, Communication pursuant to Article 94(3) EPC, EPA 04 769 660.4-1527, of Applicant 2011 Intellectual Property Trust, 6 pages total.

Oct. 18, 2011, Indian Office Action, citing Deutscher et al, Eisen et al, and Gupta et al, 1 page total.

Jul. 28, 2009, IPRP issued by the IB on behalf of the ISA, International Application No. PCT/IB2004/003399, with Written Opinion of the ISA dated Jul. 25, 2008, 4 pages total.

Int'l Publication No. WO 2005/040957 A3 published Aug. 27, 2009 with ISR, 2 pages total.

W3C Synchronized Multimedia Integration Language (SMIL 2.0) Specification, Working Draft Mar. 1, 2001, 519 pages total.

Open Mobile Alliance, MMS Conformance Document 1.2, Candidate Version Sep. 29, 2003, OMA-MMS-CONF-v1_2-20030929-C, 49-pages-total.

RealNetworks, Inc., "Realslideshow TM User's Guide, Version 2.0," 1999, 52 pages.

C. Roisin et al., "Editing SMIL with Timelines," WAM Projet, Universite Pierre Mendes, Grenoble, France, Mar. 20013, 12 pages.

* cited by examiner

MULTIMEDIA PRESENTATION EDITOR FOR A SMALL-DISPLAY COMMUNICATION TERMINAL OR COMPUTING DEVICE

CROSS REFERENCE TO RELATED APPLICATIONS

This application is a continuation of prior application Ser. No. 10/694,715, filed on Oct. 27, 2003, which is hereby incorporated by reference in its entirety.

TECHNICAL FIELD

The present invention pertains to the field of creating/editing presentations on a device with a small display. More particularly, the present invention pertains to creating presentations having content displayed/played (providing possibly text and images and sound all at the same time) based on instructions encoded using the SMIL language or a comparable XML-based language, and is especially useful for creating MMS messages using a handheld communication device, such as a cell phone.

BACKGROUND ART

Figure 1:
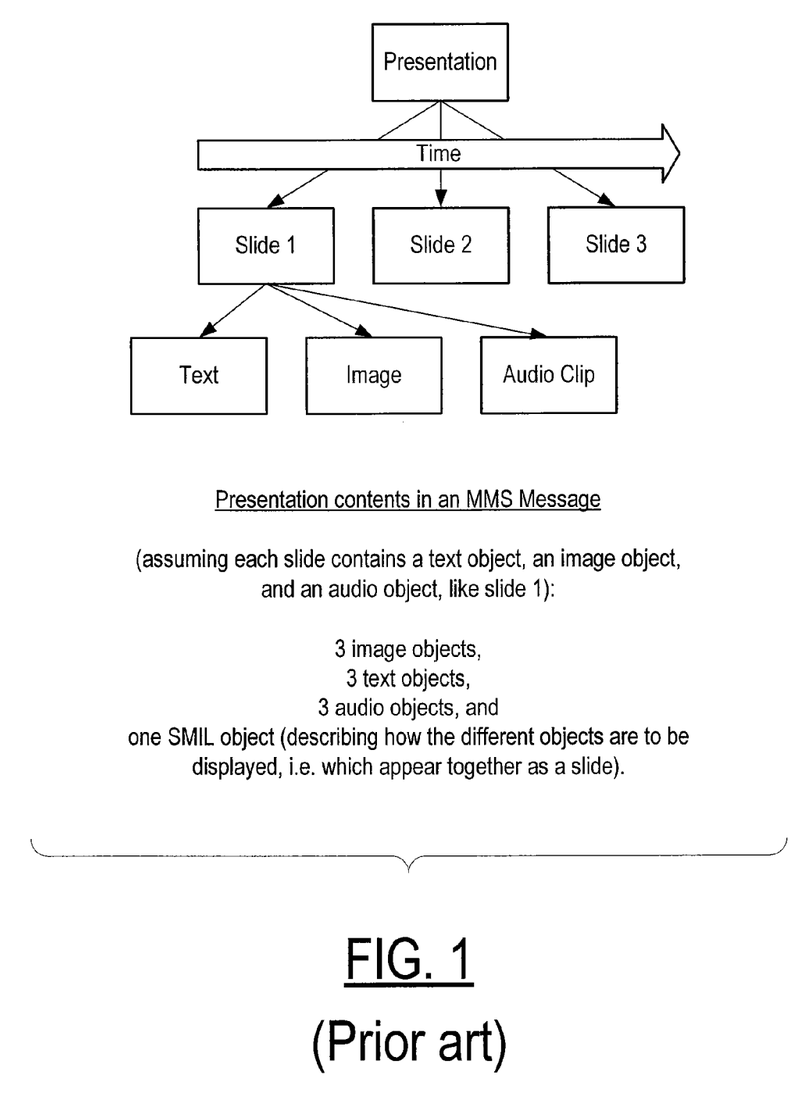
FIG. 1 illustrates the structure of a presentation object used in MMS according to the OMA MMS 1.1 and 1.2 specifications.

The invention is related to editing/creating (as opposed to viewing) multimedia presentations on a portable device. Multimedia presentations are e.g. shown by the device itself or using an external display or communicated between mobile/cell phones or other communication terminals as a part of MMS (Multimedia Messaging Service) messages, as prescribed by 3GPP (Third Generation Partnership Program) technical specifications. (MMS, like Short Message Service (SMS), provides automatic and immediate delivery of personal messages, but allows incorporating sound, images, and other rich content, transforming it into a personalized visual and audio message.) The presentation part in MMS messages can use different formats, but Synchronized Multimedia Integration Language (SMIL, pronounced "smile") 2.0 is the mandatory format specified by the current 3GPP Release 5 specification. The presentation part includes all media objects (content of the multimedia presentation) as one data object/assembly, describing their layout, timing and other aspects of displaying/playing the media objects on the receiving communication terminal. For example, if an MMS message contains two slides and each contains a text object and an image, the MMS message consists of MMS headers, two image objects, two text objects, and one SMIL object with information to the effect that the message consists of a sequence of two time containers and that the first time container contains parallel media objects (image and text). See FIG. 1 for an example of the structure of a presentation object in MMS.

SMIL is an Extensible Markup Language (XML)-based language. It contains building blocks called modules. The modules which are important from the point of view of the present invention are the so-called structure module, the timing and synchronization module, and the media object module. Each module includes one or more so-called elements and so-called attributes.

The most important elements of SMIL are the so-called "par" and "seq" elements. A par element groups object that should appear in parallel, temporally, in a presentation. For example, if text and an image are shown on one slide at the same time, they will be put within a single <par> . . . </par>pair in a block of SMIL code. A seq element may contain objects that are supposed to be presented to the user sequentially, one after the other, i.e. the second one will not become visible until the first has been displayed/played and is not longer being displayed/played. So the two slides from the previous example would typically be put within a<seq> . . . </seq>pair to indicate that they must be played in sequence. Also the main body element is treated as a seq element when timing is considered. These and some other elements are referred to as "time containers" in the SMIL language. The example above would be encoded as:

```
<smil>
    <body>
        <par>
        <!--this is slide 1-->
            <img src="image1.jpg"/>
            <text src="text1.txt"/>
        </par>
        <par>
        <!--this is slide 2-->
            <img src="image2.jpg"/>
            <text src="text2.txt"/>
        </par>
    </body>
</smil>
```

(This is a simplified encoding; an actual encoding in SMIL would include several more elements and attributes, none of which are relevant to the invention and so are omitted here for clarity.)

Although SMIL permits unlimited nesting of the time containers to create complex timing in a presentation, to ensure interoperability between different communication devices the Open Mobile Alliance (OMA) in the OMA MMS 1.1 and 1.2 specifications has limited the nesting level to two levels. The first level is the main body level and represents the entire presentation. This in turn consists of one or more par elements, which represent slides.

Even though OMA has introduced the above limitations to SMIL in order to ensure interoperability in the early days of MMS, there is no such limitation in 3GPP specifications, which define their own SMIL language profile. The 3GPP profile is slightly less powerful than the full W3C (World Wide Web Consortium) SMIL language 2.0, but regarding the nesting of the time containers it is unlimited too. The deeper nesting of the time containers allows for example making presentation "slides" less static and also allows introducing timing into a slide. For example a presentation may contain a set of slides having content that changes with time. (Thus, in a sense, with more than two levels, a slide may itself be an entire presentation/set of slides, each of which may itself be a new, further presentation/set of slides, and so on.)

MMS terminals available currently on the market are capable of editing or viewing only limited SMIL structures (in terms of time container nesting). The first (top) level of nesting represents the presentation and the second level represents slides. Media items are placed on the second level. Although some handheld terminals (such as cell/mobile phones) can play more complicated content than a two-level presentation, it is impractical today for typical cell phones or other handheld terminals to create more complicated presentations because editing a three-level timing and a two-dimensional space presentations on the typically small screen of a mobile phone or other handheld and making it usable by an average user is difficult. All handheld-hosted editors today are not intuitive or simple and are too time-consuming when used to create complex presentations.

Figure 3:
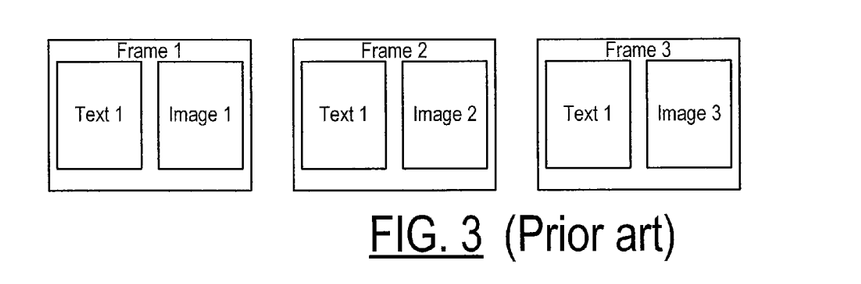
FIG. 3 illustrates the approach used by a typical multimedia editor intended for use with a desktop computer.

Prior art MMS editors for handheld terminals (such as mobile phones) do not typically allow the content of a slide in a presentation to change with time. In other words, the slides created must be static (except that the media items contained in a slide may change, e.g. video clips, animated .GIF images, etc.). Other, more sophisticated MMS editors e.g. for desktop computers as opposed to handheld devices use an approach in which the entire presentation or animation (if the software is for video editing) is divided into "frames" displayed side-by-side in columns and rows, FIG. 3 showing one row, and a user can navigate between frames (in other words, move to a different point in the presentation) using some sort of a slider widget. An approach using frames displayed side-by-side is useful for computers with big screens, so that the software can reasonably display frames side-by-side all on the same screen. But doing so is not practical on a handheld device because of the small size of the screen.

What is therefore needed is a way of providing instructions for creating a complex multimedia message such as an MMS message on a handheld device, i.e. e.g. a multimedia message that is more than two levels.

DISCLOSURE OF THE INVENTION

Accordingly, in a first aspect of the invention, a method is provided by which a multimedia presentation editor hosted by a communication or computing terminal having a display device, interfaces with a user so as to allow the user to create or edit a presentation including a slide in turn including a plurality of objects for display in playing the presentation, characterized by: a step in which the objects in each set of objects of the slide to be displayed successively one after the other when the presentation is played are instead assembled by the editor one under another in respective columns, and each single object of the slide to be displayed continuously on the slide when the presentation is played are also assembled by the editor in respective one-object columns, thereby providing a plurality of columns, wherein at least one of the columns has a plurality of objects; and a step in which the editor displays at the same time each column side-by-side with each other column on the display device; the objects of the slide thus forming on the display device when displayed by the editor one or more side-by-side vertical columns some of which may include only a single object and some of which include more than one object, thereby providing that some parts of the slide may remain fixed while the slide is displayed in play mode and some parts will change.

In accord with the first object of the invention, the multimedia presentation may be for communication as an MMS message.

In accord with the first object of the invention, SMIL may be used with the editor to prescribe how the multimedia presentation is to be played.

In a second aspect of the invention, a computer program product is provided comprising: a computer readable storage structure embodying computer program code thereon for execution by a computer processor in a communication or computing terminal, with said computer program code characterized in that it includes instructions for performing the steps of a method according to the first aspect of the invention.

In a third aspect of the invention, a communications or computing terminal is provided having a display device and including a multimedia presentation editor for creating or editing a presentation including a slide in turn including a plurality of objects for display in playing the presentation, characterized in that the editor comprises means for performing the steps of a method according to the first aspect of the invention.

In a fourth aspect of the invention, a telecommunications network is provided including a plurality of telecommunications terminals at least one of which is according to the third aspect of the invention.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention provides a hybrid solution for how to create complex multimedia presentations on a handheld device, taking what is appropriate from the various existing solutions so as to provide increased editing capability on a handheld, editing that is intuitive and relatively fast.

Figure 2:
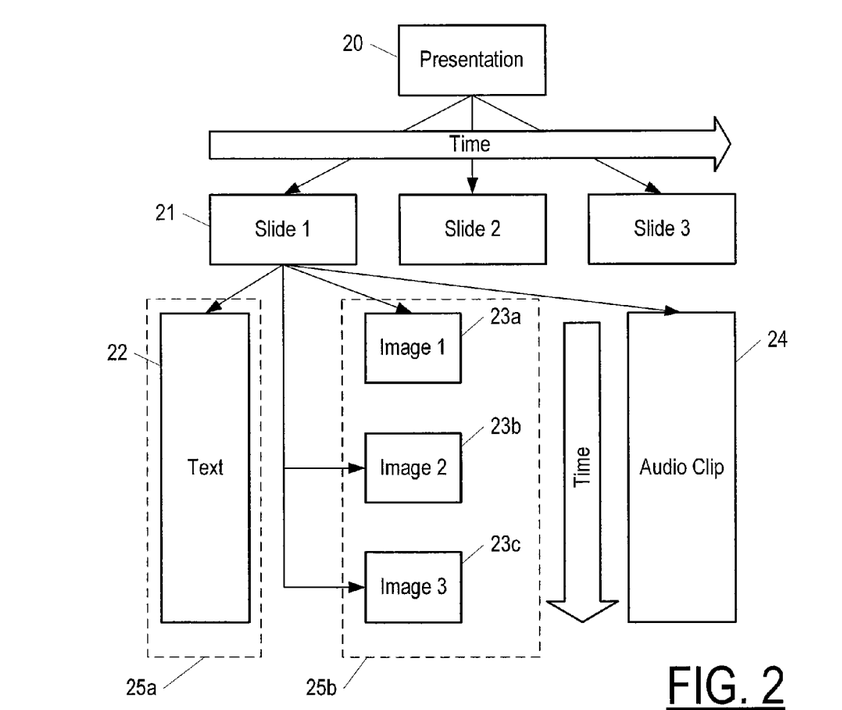
FIG. 2 illustrates the structure of message timing achievable using the invention, without making the user interface more complicated; notice the added dynamic image-changing.

Referring now to FIG. 2, in editing a presentation 20 using an editor according to the invention, the parts of a slide 21 that change (i.e. typically the images, in that the images in a set of images 23a-c are to be shown when played one at a time and one after the other, but on the same slide 21) are shown like "frames" are shown by editors for desktop computers, i.e. next to each other (more specifically, one on top of the other, as shown in FIG. 2). But the parts of the slide 21 that are static—usually the text 22 for a slide—are shown only once, i.e. are not repeated for each part (usually an image) that changes. Such a hybrid solution saves space on the screen.

The proposed solution assumes that the layout rules—i.e. e.g. the SMIL for the presentation—are fixed and that the part of a slide that does not change (typically the text) is fixed for the duration of a slide. For example, it is reasonable to suppose that a user might take three pictures with a built-in camera and might want to show the pictures in sequence in a presentation. At the same time the user might want a block of text to appear with all of the picture, such as e.g., "These are the pictures I took in front of my house." This is a likely use case because typing long text on a small device like a mobile phone (especially if it does not have a full "qwerty" keyboard) is time-consuming and so a user would likely not want to input a lot of different text blocks, whereas taking pictures is easy to do and fast. Also, it is unlikely that a user would want to manipulate the layout of a slide for a presentation on a handheld device because on a small screen there is not enough space for any (significant) manipulation.

Using these assumptions, as explained above, the solution provided by the invention is to display images one under another (not overlapping, but arranged in a column) in the presentation editor—i.e. in edit mode—with instructions for play mode (provided e.g. using SMIL) that the images be displayed in a temporal sequence, one after the other. At the same time the horizontal layout remains true, i.e. corresponds to the layout seen when the presentation is played. Thus, the vertical layout in the editor does not correspond to the actual layout seen when the presentation is played: the vertical dimension in the editor represents time.

Figure 4A:
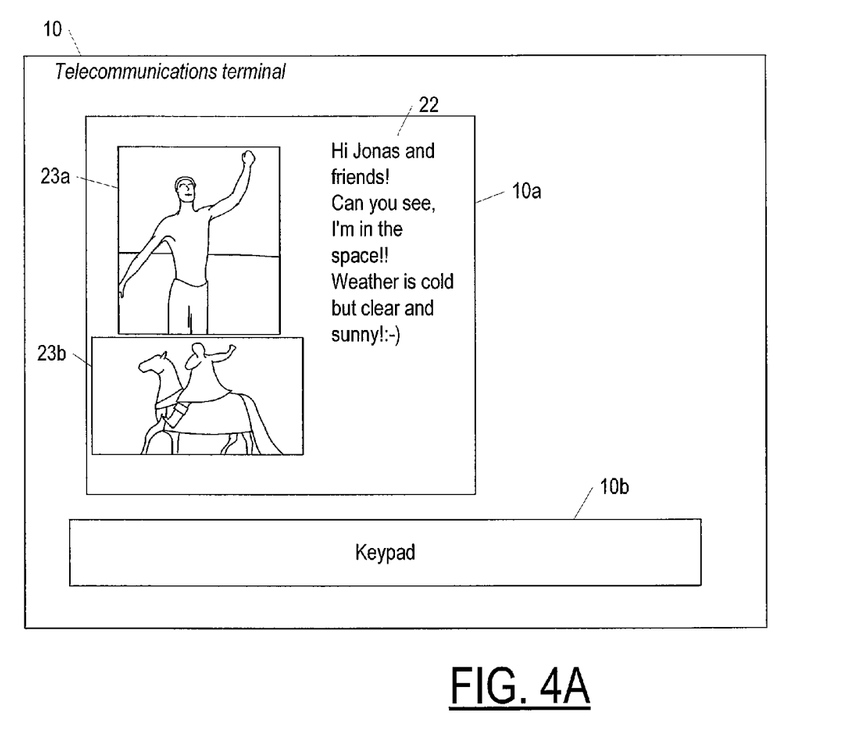
FIG. 4A illustrates an editor screen in an actual implementation of the invention—in a Series 90 MMS Editor. When the same presentation is displayed in play mode, the images are shown one after the other, instead of at the same time (i.e. they are not all displayed at the same time).

Referring now to FIG. 4A, a display device 10a of a communications or computing terminal 10 for an exemplary slide 21 is shown when the slide 21 is displayed by an editor according to the invention. The slide 21 includes two pictures 23a-b and accompanying text block 22, and so in edit mode the screen is as shown in FIG. 4A, with the two pictures 23a-b arranged in a vertical column (of two rows) and appearing on the screen at the same time, and the text block 22 appearing as the one and only row of another vertical column. The corresponding screen in play mode for the slide would show the two pictures 23a-b one after the other in time (i.e. not at the same time), with the (same) text block 22 displayed for each. The instructions for so playing the slide (i.e. for displaying it in play mode) are included e.g. in an SMIL object (not shown) included with the image objects 23a-b and text object 22 in e.g. an MMS message. Note that if the text were longer, or if there were more images in the first column, the display device 10a would provide scroll controls typically on the right hand side so as to allow viewing all the text.

The SMIL, in simplified form, corresponding to the editor screen of FIG. 4A—i.e. indicated by the editor screen of FIG. 4A as how the presentation is to be played, can be (more or less) as follows:

```
<smil>
    <body>
        <par>
        <!--this is slide 1-->
            <seq>
                <img src="image1.jpg" dur="10000ms"/>
                <img src="image2.jpg" dur="10000ms"/>
            </seq>
            <text src="text1.txt"/>
        </par>
        ...
    </body>
</smil>
```

(The "more or less" is because, as in the earlier exemplary SMIL code fragment, the SMIL code fragment here is also simplified encoding; an actual encoding in SMIL would include several more elements and attributes, none of which are relevant to the invention and so are omitted here for clarity.) To specify a presentation including both the slide(s) corresponding to the editor view of FIG. 4A and also another slide (or slides, depending on how you count) in which the same text is repeated for three different images, the SMIL code fragment would be something like:

```
<smil>
    <body>
        <par>
```

-continued

```
        <!--this is slide 1-->
            <seq>
                <img src="image1.jpg" dur="10000ms"/>
                <img src="image2.jpg" dur="10000ms"/>
            </seq>
            <text src="text1.txt"/>
        </par>
        <par>
        <!--this is slide 2-->
            <seq>
                <img src="image3.jpg" dur="10000ms"/>
                <img src="image4.jpg" dur="10000ms"/>
                <img src="image5.jpg" dur="10000ms"/>
            </seq>
            <text src="text2.txt"/>
        </par>
    </body>
</smil>
```

As can be seen from the above SMIL code fragments, the invention allows creating a slide that is described by more than two (and in fact here three) levels of time containers in SMIL (as opposed to three levels of SMIL).

Figure 4B:
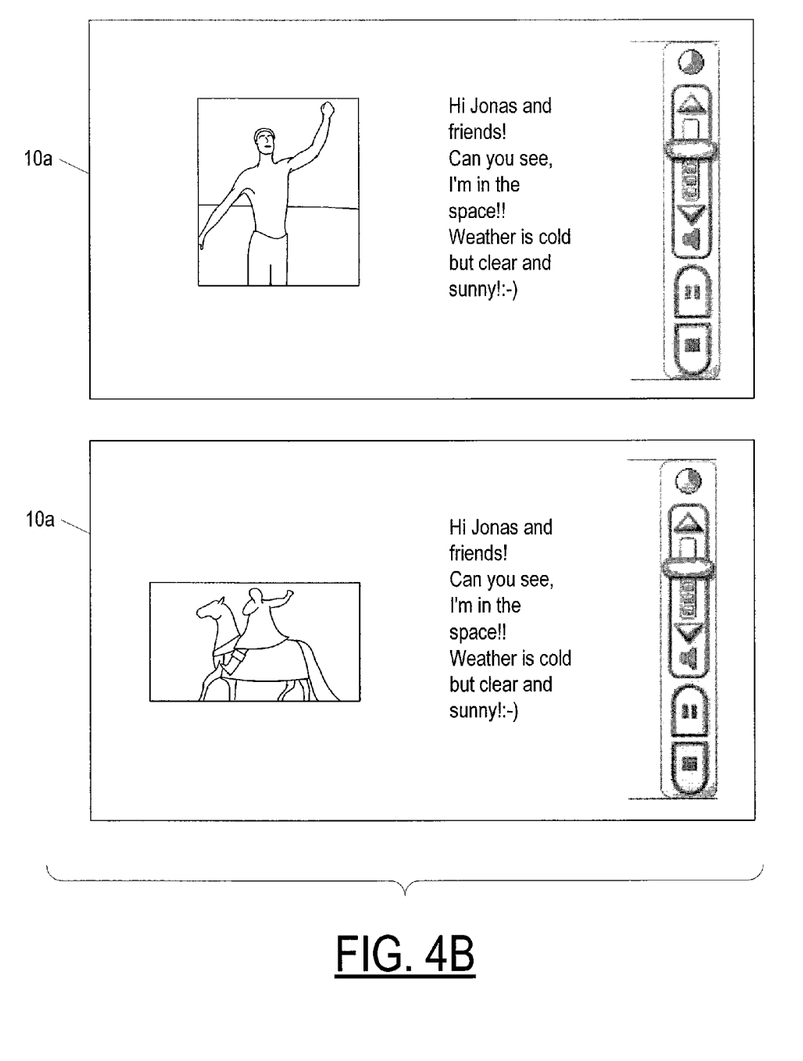
FIG. 4B illustrates the screens in play mode corresponding to the editor screen displayed in FIG. 4A.

Referring now to FIG. 4B, the two screens in play mode corresponding to the single editor screen (which, depending on the display device 10a, may not be visible all at once, and so may require scrolling) displayed in FIG. 4A are shown on a display device that may be the display device 10a of the communications or computing terminal 10 on which the exemplary slide 21 was created using an editor according to the invention (as is indicated in FIG. 4B), or that may be any other display device (not necessarily communicatively coupled to the communications or computing terminal 10). As indicated by the above code fragment for slide 1, in play mode, while slide 1 is being displayed, first image 1 is shown and then, after about 10 seconds, image 2 is shown, i.e. on the same slide.

Note that in some embodiments, to generate the SMIL (or comparable) code, the user using the editor would click on or otherwise signal the editor that the user would like to prescribe properties for an image being displayed in edit mode, and the user would then be presented with a dialog box in which the user is able to indicate e.g. the duration the image is to be displayed. The SMIL code can then be generated automatically based on the properties ascribed to each image and the arrangement of objects on the editor screen. Also, if a duration is not provided for the images, the editor can be configured to generate the SMIL code assuming a default duration for a slide and dividing the default duration for the slide into time segments of the same duration for each image. Alternatively, in some embodiments, a user can be presented with a text editor by which the user can provide the SMIL code for a slide, referring to images either based on names associated with each and included in the respective properties of the images, or based on the order in which the images appear on the screen in edit mode.

An advantage of the solution provided by the invention—at least in comparison to the frame-based approach of the prior art—is that it saves screen space and, in addition, has a more familiar look-and-feel for users already used to slide-based editors provided for use on desktop computers. To save screen space though, an editor according to the invention does not show the actual vertical alignment of the text versus image (i.e. as it is seen in playing the presentation); the user of the editor must preview the presentation in player mode to see the actual vertical alignment.

Figure 5:
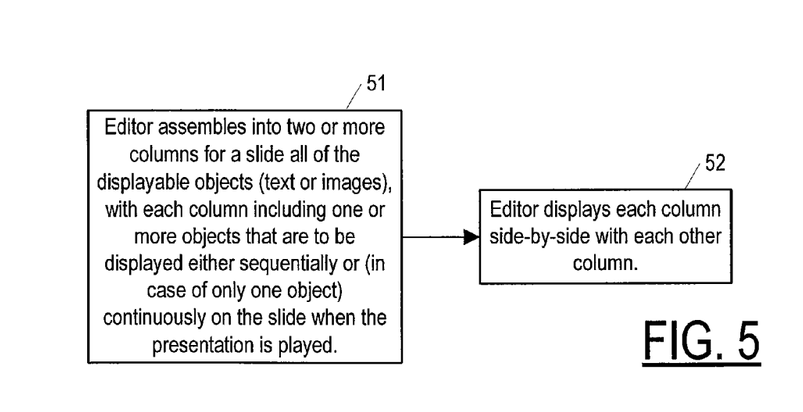
FIG. 5 is a flowchart illustrating a method according to the invention by which an editor hosted e.g. by a handheld device having a small screen enables a user to create a slide for a presentation.

Referring now to FIG. 5 (and also to FIGS. 2 and 4), the invention is shown as a method by which a multimedia presentation editor hosted by the communication or computing terminal 10 having the display device (screen) 10a, interfaces with a user so as to allow the user to create or edit the presentation 20 including a slide 21 that in turn includes a plurality of objects such as the text object 22 and the image objects 23a-c for display (and also objects 24 for providing audible components of the presentation), the method including: a step 51 in which the displayable objects 22 23a-c in each set of (typically image) objects of the slide 21 that are to be displayed sequentially (one after the other in time) in play mode are instead assembled by the editor in multi-object columns 25b, i.e. one under another, and the objects that are to be displayed continuously are assembled into one-object-long columns 25a; and a step 52 in which each column 25a-b is displayed side-by-side with each other column 25a-b. Thus, if a column includes only a single object, that object is a fixed element of the slide, i.e. it appears for the entire time the slide is displayed in play mode. On the other hand, in case of a column including more than one object, each object is displayed for only some of the time the slide is displayed in play mode. In other words, the displayable objects 22 23a-c of the slide 21 form on the display device 10a in edit mode one or more side-by-side vertical columns 25a-b some of which may include only a single object 22 and some of which may include more than one object 23a-c, thus providing that some parts of the slide 20 may remain fixed (the part with the text object 22 in the illustration of FIG. 2) while the slide is displayed in play mode and some parts may change (the part with the image objects 23a-b in the illustration of FIG. 2).

Although the invention has been shown and described in the case of unchanging text 22 and changing images 23a-c of a slide 21, so that in edit mode there are two side-by-side columns, it is also within the scope of the invention that there be more than two columns, and even that none of the columns include a single object. For example, a first column might include two objects, a second column three, and a third column four. In such a case, the timing relationships between the objects in the three columns can be specified by e.g. SMIL, or can even be automatically figure by a play device, based on the smallest number evenly divisible by the numbers of objects in each of the columns, in this case 12. An automatic determination of the timing relationship in this case would provide that each object in a column be displayed for a time proportional to the ratio of the smallest number evenly divisible by the numbers of objects in each of the columns to (divided by) the number of objects in the subject column.

The invention has been described in terms (primarily) of the steps of a method. The invention also comprehends an apparatus for performing the above described steps. Thus, for each step described above, there can be a corresponding module of an apparatus, although it is also possible for the functionality for performing more than one of the above-described steps to be incorporated into a single module. Such modules may be implemented as hardware, or may be implemented as software or firmware for execution by a processor. In particular, in the case of firmware or software, the invention is provided as a computer program product including a computer readable storage structure embodying computer program code—i.e. the software or firmware—thereon for execution by a computer processor provided with the communication or computing terminal 10.

It is important to understand that the invention is especially of use in creating presentations in any situation in which a small screen/display is used, such as in handheld communication or computing terminals including e.g. digital cameras, personal digital assistants (PDAs) and so on, i.e. in any device hosting a microprocessor enabling a user of the device to manipulate images on a display. Thus, the invention is not restricted to creating presentations that are communicated, as e.g. an MMS message; the invention pertains only to the creating of a presentation. The presentation may be played by the same device or by another device, one not even necessarily having a small screen. Moreover the presentation need not be telecommunicated to the other device, i.e. communicated over a wireline or wireless telecommunication network(s); the presentation can be created using e.g. a cell phone and then shown e.g. via an external display such as a TV or other video display device. Further, the invention can be used to create different kinds of presentations, including presentations compatible with Microsoft Powerpoint.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method comprising:

assembling in a handheld telecommunication terminal a plurality of image objects of a slide in a first column, the plurality of image objects forming part of the slide that change and are to be displayed sequentially one after the other when a multimedia presentation is played on the handheld telecommunication terminal having a display device, and also assembling in the handheld telecommunication terminal any and all objects of the slide in a second column, the any and all objects forming part of the slide that remain static and are to be displayed in parallel with and side-by-side with any of the plurality of image objects of the first column when the multimedia presentation is played; and displaying at the same time the first and second column side-by-side on the display device in the same horizontal arrangement as the objects will be displayed when the multimedia presentation is played, for editing by a user, wherein a synchronized multimedia integration language is used to prescribe how the multimedia presentation is to be played.

2. A method as in claim 1, wherein the multimedia presentation is for communication as a multimedia message service message.

3. A method as in claim 1, wherein the second column includes only one object, which is to be displayed continuously when the presentation is played.

4. A method as in claim 1, wherein the method further comprises receiving a signal from the user containing information that the user would like to prescribe one or more properties for an image being displayed in an edit mode.

5. A method as in claim 1, wherein the method further comprises receiving from the user the duration the plurality of objects is to be displayed.

6. A method as in claim 5, wherein the method further comprises generating a code based on the duration the plurality of objects is to be displayed, including where the code is based on a synchronized multimedia integration language.

7. A method as in claim 1, wherein the method further comprises generating a code assuming a default duration for a slide into time segments of the same duration for each image, including where the code is based on a synchronized multimedia integration language.

8. A method as in claim 1, wherein the method further comprises presenting the user with a text editor by which the user can provide a code for a slide, including referring to images either based on names associated with each and included in respective properties of the images, or based on an order in which the images appear on the display device in an edit mode, and also including where the code is based on a synchronized multimedia integration language.

9. A non-transitory computer readable medium embodying computer program code thereon that when executed by a computer processor in a communication or computing terminal is operable to:
assemble in a handheld telecommunication terminal a plurality of image objects of a slide in a first column, the plurality of image objects forming part of the slide that change and are to be displayed sequentially one after the other when a multimedia presentation is played on the handheld telecommunication terminal having a display device, and also assembling in the handheld telecommunication terminal any and all objects of the slide in a second column, the any and all objects forming part of the slide that remain static and are to be displayed in parallel with and side-by-side with any of played; and
device in the same horizontal arrangement as the objects will be displayed when the multimedia integration language is used to prescribe how the multimedia presentation is to be played.

10. An apparatus, comprising:
means for assembling in a handheld telecommunication terminal a plurality of image objects of a slide in a first column, the plurality of image objects forming part of the slide that change and are to be displayed sequentially one after the other when a multimedia presentation is played on the handheld telecommunication terminal having a display device, and also assembling in the handheld telecommunication terminal any and all objects of the slide in a second column, the any and all objects forming part of the slide that remain static and are to be displayed in parallel with and side-by-side with any of the plurality of image objects of the first column when the multimedia presentation is played; and
means for displaying at the same time the first and second column side-by-side on the display device in the same horizontal arrangement as the objects will be displayed when the multimedia presentation is played for editing by a user, comprises:
wherein a synchronized multimedia integration language is used to prescribe how the multimedia presentation is to be played.

11. An apparatus as in claim 10, wherein the multimedia presentation is for communication as a multimedia message service message.

12. An apparatus as in claim 10, wherein the second column includes only one object, which is to be displayed continuously when the presentation is played.

13. An apparatus, comprising a processor configured via instructions stored on a computer-readable storage structure embodying computer program code so as to:
assemble in a handheld telecommunication terminal a plurality of image objects of a slide in a first column, the plurality of image objects forming part of the slide that change and are to be displayed sequentially one after the other when a multimedia presentation is played on the handheld telecommunication terminal having a display device, and also assembling in the handheld telecommunication terminal any and all objects of the slide in a second column, the any and all objects forming part of the slide that remain static and are to be displayed in parallel with and side-by-side with any of the plurality of image objects of the first column when the multimedia presentation is played;
display at the same time the first and second column side-by-side on the display device in the same horizontal arrangement as the objects will be displayed when the multimedia presentation is played for editing by a user;
wherein a synchronized multimedia integration language is used to prescribe how the multimedia presentation is to be played.

14. An apparatus as in claim 13, wherein the multimedia presentation is for communication as a multimedia message service message.

15. An apparatus as in claim 13, wherein the second column includes only one object, which is to be displayed continuously when the presentation is played.

* * * * *

UNITED STATES PATENT AND TRADEMARK OFFICE
CERTIFICATE OF CORRECTION

| | | |
|---|---|---|
| PATENT NO. | : 8,683,341 B2 | Page 1 of 1 |
| APPLICATION NO. | : 13/274620 | |
| DATED | : March 25, 2014 | |
| INVENTOR(S) | : Jussi Maaniitty et al. | |

It is certified that error appears in the above-identified patent and that said Letters Patent is hereby corrected as shown below:

In the Claims

Column 9, line 18, through line 24, cancel the text beginning with "the any and all" and ending with "is to be played." and insert the following text --the any and all objects forming part of the slide that remain static and are to be displayed in parallel with and side-by-side with any of the plurality of image objects of the first column when the multimedia presentation is played; and display at the same time the first and second column side-by-side on the display device in the same horizontal arrangement as the objects will be displayed when the multimedia presentation is played, for editing by a user, when a synchronized multimedia integration language is used to prescribe how the multimedia presentation is to be played.--.

Column 10, line 3, delete ", comprises:".

Column 10, line 27, after "played;" add --and--.

Signed and Sealed this
Twenty-third Day of September, 2014

Michelle K. Lee
*Deputy Director of the United States Patent and Trademark Office*